(12) United States Patent
Hupfield et al.

(10) Patent No.: US 8,022,156 B2
(45) Date of Patent: Sep. 20, 2011

(54) GREASEPROOF PAPER

(75) Inventors: Peter Cheshire Hupfield, Trevaughan (GB); Tetsuya Masutani, Osaka (JP); Shinichi Minami, Osaka (JP); Ikuo Yamamoto, Osaka (JP)

(73) Assignees: Dow Corning Corporation, Midland, MI (US); Daikin Industries, Ltd., Osaka (JP)

( * ) Notice: Subject to any disclaimer, the term of this patent is extended or adjusted under 35 U.S.C. 154(b) by 176 days.

(21) Appl. No.: 12/375,086

(22) PCT Filed: Jul. 24, 2007

(86) PCT No.: PCT/US2007/074185
§ 371 (c)(1),
(2), (4) Date: May 19, 2009

(87) PCT Pub. No.: WO2008/014239
PCT Pub. Date: Jan. 31, 2008

(65) Prior Publication Data
US 2010/0018659 A1    Jan. 28, 2010

(51) Int. Cl.
*C08F 30/08*    (2006.01)

(52) U.S. Cl. ...... 526/279; 525/474; 428/447; 162/164.4
(58) Field of Classification Search .......... 526/279, 526/319; 525/474, 479; 428/447, 391
See application file for complete search history.

(56) References Cited

U.S. PATENT DOCUMENTS

| 5,247,008 A | 9/1993 | Michels et al. |
| 7,776,982 B2 * | 8/2010 | Yamamoto et al. ........... 526/279 |
| 2006/0134439 A1 * | 6/2006 | Yamamoto et al. ........... 428/447 |

FOREIGN PATENT DOCUMENTS
FR    2766216 A1    1/1999

* cited by examiner

*Primary Examiner* — Mark Halpern
(74) *Attorney, Agent, or Firm* — Dinsmore & Shohl LLP

(57) ABSTRACT

A greaseproof paper is provided for use in food processing and/or packaging of foods in which paper has been rendered oleophobic by treatment with a fluorine-containing polymer. The fluorine-containing polymer may be prepared by polymerizing a fluorine-containing monomer in the presence of a mercapto group-containing organopolysiloxane. The fluorine-containing polymer may be applied to paper by coating onto pre-formed paper, or by applying the polymer as a size during a papermaking process.

7 Claims, No Drawings

GREASEPROOF PAPER

This application is a 371 of PCT/US07/74185 filed 24 Jul. 2007.

This invention relates to greaseproof paper, that is paper that has been rendered oleophobic. Greaseproof paper is widely used in food processing, particularly in baking of cakes and biscuits, and in packaging of oily or fatty foods such as hamburgers, sandwiches and chips (French fries).

Fluorine-containing polymers have been used to impart oleophobicity to paper. For example, U.S. Pat. No. 5,247,008 describes finishing agents for textiles, leather, paper and mineral substrates which are aqueous dispersions of a copolymer of a perfluoroalkyl acrylate or methacrylate, an alkyl acrylate or methacrylate and an aminoalkyl acrylate or methacrylate.

FR-A-2766216 describes additives for treating paper based materials against grease and fat, for use with foodstuffs, consisting of aqueous emulsions of i) fluorinated compounds and ii) two of the following: a) a dispersing agent; b) a lubricant; c) a soap; d) an impermeability agent; e) and an emulsifying agent.

Greaseproof paper according to the present invention comprises paper rendered oleophobic by treatment with a fluorine-containing polymer, characterised in that the fluorine-containing polymer comprises repeating units derived from:
(A) a monomer which comprises a fluorine-containing monomer of the formula:

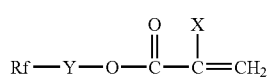

(I)

wherein X is a hydrogen atom, an linear or branched alkyl group having 1 to 21 carbon atoms, a fluorine atom, a chlorine atom, a bromine atom, a iodide atom, a $CFX^1X^2$ group (wherein $X^1$ and $X^2$ is a hydrogen atom, a fluorine atom, a chlorine atom, a bromine atom or a iodide atom.), a cyano group, a linear or branched fluoroalkyl group having 1 to 21 carbon atoms, a substituted or unsubstituted benzyl group, or a substituted or unsubstituted phenyl group, Y is an aliphatic group having 1 to 10 carbon atoms, an aromatic or cycloaliphatic group having 6 to 10 carbon atoms, a —$CH_2CH_2N(R^1)SO_2$— group (wherein $R^1$ is an alkyl group having 1 to 4 carbon atoms) or —$CH_2CH(OY^1)CH_2$— group (wherein $Y^1$ is a hydrogen atom or an acetyl group), and Rf is a linear or branched fluoroalkyl group having 1 to 21 carbon atoms, wherein the fluorine-containing polymer comprises an organopolysiloxane moiety derived from (B) a mercapto group-containing organopolysiloxane.

The invention includes a method of rendering paper oleophobic, wherein the paper is treated with a fluorine-containing polymer as defined above.

The invention also includes a novel fluorine-containing polymer comprising repeating units derived from:
(A) a monomer which comprises a fluorine-containing monomer of the formula:

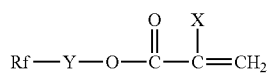

(I)

wherein X is a hydrogen atom, an linear or branched alkyl group having 1 to 21 carbon atoms, a fluorine atom, a chlorine atom, a bromine atom, a iodide atom, a $CFX^1X^2$ group (wherein $X^1$ and $X^2$ is a hydrogen atom, a fluorine atom, a chlorine atom, a bromine atom or a iodide atom.), a cyano group, a linear or branched fluoroalkyl group having 1 to 21 carbon atoms, a substituted or unsubstituted benzyl group, or a substituted or unsubstituted phenyl group, Y is an aliphatic group having 1 to 10 carbon atoms, an aromatic or cycloaliphatic group having 6 to 10 carbon atoms, a —$CH_2CH_2N(R^1)SO_2$— group (wherein $R^1$ is an alkyl group having 1 to 4 carbon atoms) or —$CH_2CH(OY^1)CH_2$— group (wherein $Y^1$ is a hydrogen atom or an acetyl group), and Rf is a linear or branched fluoroalkyl group having 1 to 21 carbon atoms, wherein the fluorine-containing polymer comprises an organopolysiloxane moiety derived from (B) a mercapto group-containing organopolysiloxane, and also comprises repeating units derived from an olefinically unsaturated monomer (C') containing an acid phosphate ester, phosphonic acid or acid phosphonate ester group. The novel polymer is useful in rendering paper oleophobic and also for imparting oleophobicity and oil repellency to fabrics without imparting a harsh feel to the fabric surface.

The paper which is treated according to the invention can be conventional paper from cellulosic fibres such as wood pulp or recycled pulp consisting mainly of cellulosic fibres. The paper can alternatively be formed from polymer fibres, for example polyolefin fibres.

The fluorine-containing polymer used in the present invention can in general be prepared by polymerizing the fluorine-containing monomer (A) in the presence of the mercapto group-containing silicone (B).

The mercapto group-containing silicone (B) acts as a chain transfer agent in the polymerization reaction and is an organopolysiloxane having a mercapto-functional organic group present in the molecule.

Organopolysiloxanes are well known and are often designated by the general formula $R_nSiO_{(4-n)/2}$, where the organopolysiloxanes may comprise any number of "M" (mono functional) siloxy units ($R_3SiO_{0.5}$), "D" (difunctional) siloxy units ($R_2SiO$), "T" (trifunctional) siloxy units ($RSiO_{1.5}$), or "Q" siloxy units ($SiO_2$) where R is independently a monovalent organic group. These siloxy units can be combined in various manners to form cyclic, linear, or branched structures. The chemical and physical properties of the resulting polymeric structures can vary. For example organopolysiloxanes can be volatile or low viscosity fluids, high viscosity fluids/gums, elastomers or rubbers, and resins. R is independently a monovalent organic group, alternatively R is a hydrocarbon group containing 1 to 30 carbons, alternatively R is an alkyl group containing 1 to 30 carbon atoms, or alternatively R is methyl.

The organopolysiloxanes useful as component (B) in the present invention are characterized by having at least one of the R groups in the formula $R_nSiO_{(4-n)/2}$ be a mercapto-functional group, or alternatively at least one of the R groups be a mercapto-functional group and one of the R groups be an organofunctional group, or alternatively one of the R groups be an organofunctional group also containing a mercapto group. As used herein, "organofunctional group" means an organic group containing any number of carbon atoms, but the group contains at least one atom other than carbon and hydrogen and sulfur. The organofunctional group and mercapto-functional group may each be present on any siloxy unit having an R substituent, that is, they may be present on any M, D, or T unit. Typically, the organofunctional groups and mercapto-functional groups are each present as a substituent on a D siloxy unit.

Representative examples of such organofunctional groups include, amines, amides, sulfonamides, quaternaries, ethers, epoxy, phenols, esters, carboxyls, ketones, halogen substituted alkyls and aryls group. In many preferred organopolysiloxanes, the organofunctional group is an amino-functional organic group.

The mercapto-functional organic group is designated in the formulae herein as $R^S$ and is illustrated by groups having the formula; —$R^1SR^2$, wherein each $R^1$ and $R^2$ is as defined above. The mercapto-functional group is illustrated by the following formulae; $CH_2CH_2CH_2SH$, —$CH_2CHCH_3SH$, —$CH_2CH_2CH_2CH_2SH$, —$CH_2CH_2CH_2CH_2CH_2SH$, —$CH_2CH_2CH_2CH_2CH_2CH_2SH$, —$CH_2CH_2SCH_3$. Typically, the mercapto functional group is —$CH_2CH_2CH_2SH$.

When the organofunctional group is an amino-functional organic group, the amino-functional organic group is designated in the formulas herein as $R^N$ and is illustrated by groups having the formula; —$R^1NHR^2$, —$R^1NR_2^2$, or —$R^1NHR^1NHR^2$, wherein each $R^1$ is independently a divalent hydrocarbon group having at least 2 carbon atoms, and $R^2$ is hydrogen or an alkyl group. Each $R^1$ is typically an alkylene group having from 2 to 20 carbon atoms. $R^1$ is illustrated by groups such as; —$CH_2CH_2$—, —$CH_2CH_2CH_2$—, —$CH_2CHCH_3$—, —$CH_2CH_2CH_2CH_2$—, —$CH_2CH(CH_3)CH_2$—, —$CH_2CH_2CH_2CH_2CH_2$—, —$CH_2CH_2CH_2CH_2CH_2CH_2$—, —$CH_2CH_2CH(CH_2CH_3)CH_2CH_2$—, —$CH_2CH_2CH_2CH_2CH_2CH_2CH_2CH_2$—, and —$CH_2CH_2CH_2CH_2CH_2CH_2CH_2CH_2CH_2CH_2$—. The alkyl groups $R^2$ are as illustrated above for R. When $R^2$ is an alkyl group, it is typically methyl.

Some examples of suitable amino-functional hydrocarbon groups are;
—$CH_2CH_2NH_2$,
—$CH_2CH_2CH_2NH_2$, —$CH_2CHCH_3NH$,
—$CH_2CH_2CH_2CH_2NH_2$,
—$CH_2CH_2CH_2CH_2CH_2NH_2$,
—$CH_2CH_2CH_2CH_2CH_2CH_2NH_2$,
—$CH_2CH_2NHCH_3$, —$CH_2CH_2CH_2NHCH_3$, —$CH_2(CH_3)CHCH_2NHCH_3$,
—$CH_2CH_2CH_2CH_2NHCH_3$, —$CH_2CH_2NHCH_2CH_2NH_2$,
—$CH_2CH_2CH_2NHCH_2CH_2CH_2NH_2$,
—$CH_2CH_2CH_2CH_2NHCH_2CH_2CH_2NH_2$,
—$CH_2CH_2NHCH_2CH_2NHCH_3$,
—$CH_2CH_2CH_2CH_2NHCH_2CH_2NHCH_3$,
—$CH_2CH_2CH_2CH_2NHCH_2CH_2CH_2NHCH_3$, and
—$CH_2CH_2NHCH_2CH_2NHCH_2CH_2CH_2CH_3$. Typically, the amino functional group is —$CH_2CH_2CH_2NH_2$.

The mercapto functional organopolysiloxane can for example comprise siloxy units having the average formula;

$(R_2SiO)_a(RR^NSiO)_b(RR^SSiO)_c$ where;
a is 0-4000, alternatively 0 to 1000, alternatively 0 to 400,
b is 1-1000, alternatively 1 to 100, alternatively 1 to 50,
c is 1-1000, alternatively 1 to 100, alternatively 1 to 50;
R is independently a monovalent organic group, for example R is a hydrocarbon group containing 1-30 carbon atoms, for example a monovalent alkyl group containing 1-12 carbons such as a methyl group;
$R^N$ is a monovalent amino functional organic group as defined above,
$R^S$ is a monovalent mercapto functional organic group as defined above.

Such an organopolysiloxane (an amino-mercapto functional organopolysiloxane terpolymer) may be terminated with a hydrogen atom (resulting in a silanol group on the terminal siloxy unit of the terpolymer), or with an alkyl group containing 1-30 carbon atoms (resulting in an alkoxy group on the terminal siloxy unit of the terpolymer). When an alkyl group is used, the alkyl group can be a linear or branched alkyl, containing 1-30 carbons, for example the alkyl group can be a long chain alkyl group of 4-20, particularly 8-20, carbon atoms such as stearyl. Alternatively the organopolysiloxane can be terminated with a trimethylsilyl group.

The amino-mercapto functional organopolysiloxane terpolymer can in a first embodiment generally be represented by the following average formula for example;

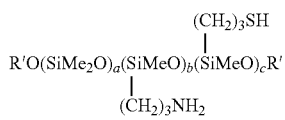

where;
a is 0-4000, alternatively 0 to 1000, alternatively 0 to 400,
b is 1-1000, alternatively 1 to 100, alternatively 1 to 50,
c is 1-1000, alternatively 1 to 100, alternatively 1 to 50;
and R' is H, an alkyl group having 1 to 40 carbon atoms, or $Me_3Si$.

The amino-mercapto functional organopolysiloxane terpolymers of the first embodiment can be prepared by any technique known in the art for preparation of organopolysiloxane terpolymers containing amino and/or mercapto functional groups. Typically, the organopolysiloxane terpolymers are prepared via a condensation polymerization reaction of an amino functional alkoxy silane, a mercapto functional silane monomer, and organopolysiloxane having alkoxy or silanol termination as illustrated by the following general reaction scheme.

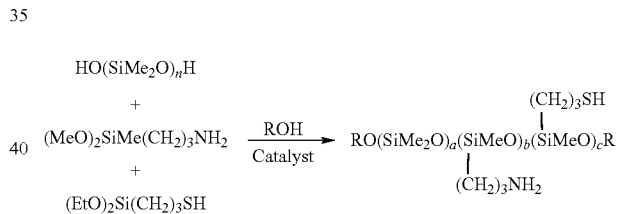

Condensation organopolysiloxanes are well known in the art and are typically catalyzed by the addition of a strong base, such as an alkaline metal hydroxide, or a tin compound. Alternatively co-polymerisation of functionalized cyclosiloxanes could be used.

The mercapto functional organopolysiloxane may in particular comprise siloxy units having the average formula;

$R_3SiO(R_2SiO)_a(RR^NSiO)_b(RR^SSiO)_cSiR_3$ where;
a is 0-4000, alternatively 1 to 1000, alternatively 1 to 400,
b is 1-1000, alternatively 1 to 100, alternatively 1 to 50,
c is 1-1000, alternatively 1 to 100, alternatively 1 to 50;
R is independently a monovalent organic group, such as a hydrocarbon containing 1-30 carbon atoms, for example R is a monovalent alkyl group containing 1-12 carbons such as a methyl group;
$R^N$ is a monovalent amino functional organic group as defined above,
$R^S$ is a monovalent mercapto functional organic group as defined above.

The fluorine-containing monomer (A) is a compound of the formula:

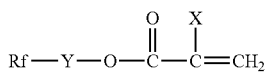
(I)

wherein X is a hydrogen atom, an linear or branched alkyl group having 1 to 21 carbon atoms, a fluorine atom, a chlorine atom, a bromine atom, a iodide atom, a $CFX^1X^2$ group (wherein $X^1$ and $X^2$ is a hydrogen atom, a fluorine atom, a chlorine atom, a bromine atom or a iodide atom.), a cyano group, a linear or branched fluoroalkyl group having 1 to 21 carbon atoms, a substituted or unsubstituted benzyl group, or a substituted or unsubstituted phenyl group, Y is an aliphatic group having 1 to 10 carbon atoms, an aromatic or cycloaliphatic group having 6 to 10 carbon atoms, a —$CH_2CH_2N(R^1)SO_2$— group (wherein $R^1$ is an alkyl group having 1 to 4 carbon atoms) or —$CH_2CH(OY^1)CH_2$— group (wherein $Y^1$ is a hydrogen atom or an acetyl group), and Rf is a linear or branched fluoroalkyl group having 1 to 21 carbon atoms. The fluorine-containing polymer can in general be prepared by polymerizing the monomer (A) in the presence of (B) a mercapto group-containing silicone to give the polymer.

The alpha-position of the fluorine-containing monomer may be substituted with a halogen atom or the like. Accordingly, in the formula (I), X may be an linear or branched alkyl group having 2 to 21 carbon atoms, a fluorine atom, a chlorine atom, a bromine atom, a iodide atom, a $CFX^1X^2$ group (wherein $X^1$ and $X^2$ is a hydrogen atom, a fluorine atom, a chlorine atom, a bromine atom or a iodide atom.), a cyano group, a linear or branched fluoroalkyl group having 1 to 21 carbon atoms, a substituted or unsubstituted benzyl group, or a substituted or unsubstituted phenyl group.

In the formula (I), the Rf group is preferably a perfluoroalkyl group. The carbon number of the Rf group is from 1 to 21, for example, from 1 to 6, particularly

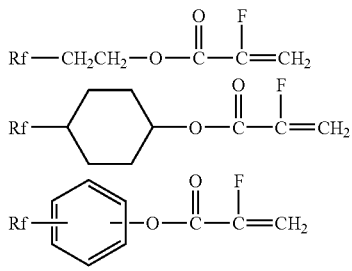

from 1 to 4.

Y is preferably an aliphatic group having 1 to 10 carbon atoms, an aromatic group or cycloaliphatic group having 6 to 10 carbon atoms, a —$CH_2CH_2N(R^1)SO_2$— group ($R^1$ is an alkyl group having 1 to 4 carbon atoms.) or a —$CH_2CH(OY^1)CH_2$— group ($Y^1$ is a hydrogen atom or an acetyl group.). The aliphatic group is preferably an alkylene group (particularly the carbon number is from 1 to 4, for example, 1 or 2.). The aromatic group and cycloaliphatic group may be substituted or unsubstituted.

Examples of fluorine-containing monomer (A) are those of the formulae:

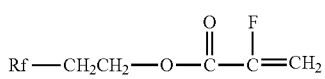

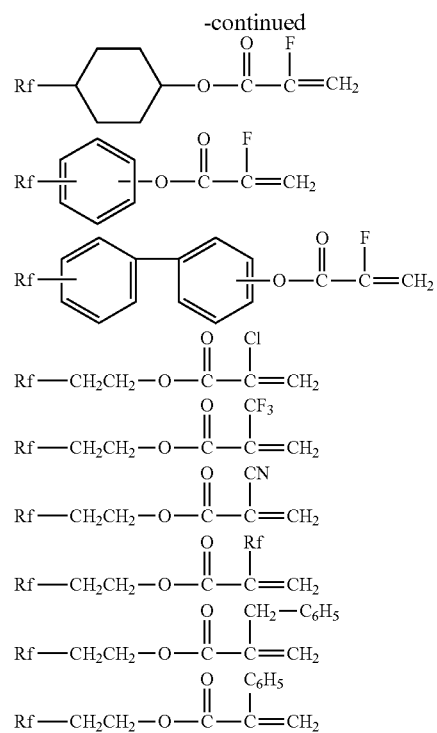

wherein Rf is a linear or branched fluoroalkyl group having, for example, 1 to 6 carbon atoms.

Representative non-limiting examples of the fluoroalkyl ester monomer (A) include:
$CF_3(CF_2)_7(CH_2)_2OCOCH=CH_2$
$CF_3(CF_2)_7(CH_2)_2OCOC(CH_3)=CH_2$
$CF_3(CF_2)_7(CH_2)_{10}OCOCH=CH_2$
$CF_3(CF_2)_7(CH_2)_{10}OCOC(CH_3)=CH_2$
$CF_3(CF_2)_6CH_2OCOCH=CH_2$
$CF_3(CF_2)_8CH_2OCOCH=CH_2$
$(CF_3(CF(CF_2)_6(CH_2)_2OCOCH=CH_2$
$(CF_3)_2CF(CF_2)_8(CH_2)_2OCOCH=CH_2$
$(CF_3)_2CF(CF_2)_{10}(CH_2)_2OCOCH=CH_2$
$(CF_3)_2CF(CF_2)_6(CH_2)_2OCOC(CH_3)=CH_2$
$(CF_3)_2CF(CF_2)_8(CH_2)_2OCOC(CH_3)=CH_2$
$(CF_3)_2CF(CF_2)_{10}(CH_2)_2OCOC(CH_3)=CH_2$
$CF_3(CF_2)_9(CH_2)_2OCOCH=CH_2$
$CF_3(CF_2)_9(CH_2)_2OCOC(CH_3)=CH_2$
$CF_3(CF_2)_{11}(CH_2)_2OCOCH=CH_2$
$CF_3(CF_2)_{11}(CH_2)_2OCOC(CH_3)=CH_2$
$CF_3(CF_2)_7SO_2N(CH_3)(CH_2)_2OCOCH=CH_2$
$CF_3(CF_2)_7SO_2N(C_2H_5)(CH_2OCOCH=CH_2$
$(CF_3)_2CF(CF_2)_8CH_2CH(OCOCH_3)CH_2OCOC(CH_3)=CH_2$
$(CF_3)_2CF(CF_2)_6CH_2CH(OH)CH_2OCOCH=CH_2$
$C_8F_{17}$—O-Ph-$CH_2OCOCH=CH_2$ (where Ph represents 1,4-phenylene)
$C_5F_{11}$—O-Ph-$CH_2OCOC(CH_3)=CH_2$
$C_8F_{17}$—O-Ph-$COOCH_2CH(OH)CH_2OCOC(CH_3)=CH_2$
$(CF_3)_2CFOCOC(CH_3)=CH_2$
$(CF_3)_2CF(CH_2)_2OCOC(CH_3)=CH_2$
$CF_3(CF_2)_7SO_2N(CH_3)(CH_2)_2OCOC(F)=CH_2$
$CF_3(CF_2)_7SO_2N(CH_3)(CH_2)_2OCOC(Cl)=CH$,
$CF_3(CF_2)_7SO_2N(CH_3)(CH_2)_2OCOC(Br)=CH_2$
$CF_3(CF_2)_7SO_2N(CH_3)(CH_2)_2OCOC(I)=CH_2$
$CF_3(CF_2)_7SO_2N(CH_3)(CH_2)_2OCOC(CF_3)=CH_2$
$CF_3(CF_2)_7SO_2N(CH_3)(CH_2)_2OCOC(CN)=CH_2$
$CF_3(CF_2)_7SO_2N(CH_3)(CH_2)_2OCOC(C_6H_5)=CH_2$ CF$_3$(CF$_2$)$_7$(CH$_2$)$_2$OCOC(F)=CH$_2$
CF$_3$(CF$_2$)$_7$(CH$_2$)$_2$OCOC(Cl)=CH$_2$
CF$_3$(CF$_2$)$_7$(CH$_2$)$_2$OCOC(Br)=CH$_2$
CF$_3$(CF$_2$)$_7$(CH$_2$)$_2$OCOC(I)=CH$_2$
CF$_3$(CF$_2$)$_7$(CH$_2$)$_2$OCOC(CF$_3$)=CH$_2$
CF$_3$(CF$_2$)$_7$(CH$_2$)$_2$OCOC(CN)=CH$_2$
CF$_3$(CF$_2$)$_7$(CH$_2$)$_2$OCOC(C$_6$H$_5$)=CH$_2$ The fluorine-containing polymer may be a homopolymer formed from one fluorine-containing monomer (A), modified by being polymerised in the presence of the mercapto group-containing silicone (B). The fluorine-containing polymer may alternatively be a copolymer formed from at least two monomers. The copolymer may have repeating units derived from at least two fluorine-containing monomers (A), or may have, in addition to the repeating units derived from the fluorine-containing monomer (A), repeating units derived from an olefinically unsaturated fluorine-free monomer (C) and optionally the crosslinkable monomer.

The fluorine-free monomer (C) may be an acrylate or methacrylate ester having an alkyl group. The number of carbon atoms of the alkyl group may be from 1 to 30, for example, from 6 to 30, e.g., from 10 to 30. For example, fluorine-free monomer (C) may be an acrylate of the general formula:

$$CH_2=CA^1COOA^2$$

wherein A$^1$ is a hydrogen atom, a methyl group, or a halogen atom (for example, a chlorine atom, a bromine atom and a iodine atom) other than a fluorine atom, and A$^2$ is an alkyl group represented by C$_n$H$_{2n+1}$ (n=1 to 30).

Alternatively or additionally, the fluorine-free monomer (C) can be another type of compound having one carbon-carbon double bond. Preferable examples of the fluorine-free monomer (C) include, for example, ethylene, vinyl acetate, vinyl propionate, vinyl halide such as vinyl chloride, vinylidene halide such as vinylidene chloride, acrylonitrile, methacrylonitrile, styrene, ethylene, a vinyl alkyl ether, isoprene, polyethyleneglycol (meth)acrylate, polypropyleneglycol (meth)acrylate, methoxypolyethyleneglycol (meth)acrylate, methoxypolypropyleneglycol (meth)acrylate, vinyl alkyl ether and isoprene. The fluorine-free monomer (C) is not limited to these examples.

According to one aspect of the invention, the fluorine-free monomer (C) can be a monomer (C') containing an acid phosphate ester, phosphonic acid or acid phosphonate ester group. We have found that the presence of an acid phosphate ester, phosphonic acid or acid phosphonate ester group in the polymer may improve the hydrophobicity of the fluorine-containing polymer and/or the adhesion to and retention of the fluorine-containing polymer by the paper. The monomer (C') can for example comprise an acrylate of the general formula:

$$CH_2=CA^1COOA^3$$

wherein A$^1$ is a hydrogen atom, a methyl group or a halogen atom other than a fluorine atom, and A$^3$ is a hydrocarbon group having 1 to 30 carbon atoms substituted by an acid phosphate ester, phosphonic acid or acid phosphonate ester group.

Fluorine-containing polymers comprising repeating units derived from:

(A) a monomer which comprises a fluorine-containing monomer of the formula:

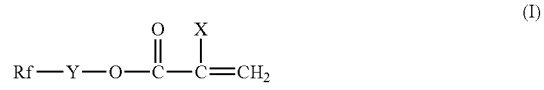

wherein X is a hydrogen atom, an linear or branched alkyl group having 1 to 21 carbon atoms, a fluorine atom, a chlorine atom, a bromine atom, a iodide atom, a CFX$^1$X$^2$ group (wherein X$^1$ and X$^2$ is a hydrogen atom, a fluorine atom, a chlorine atom, a bromine atom or a iodide atom.), a cyano group, a linear or branched fluoroalkyl group having 1 to 21 carbon atoms, a substituted or unsubstituted benzyl group, or a substituted or unsubstituted phenyl group, Y is an aliphatic group having 1 to 10 carbon atoms, an aromatic or cycloaliphatic group having 6 to 10 carbon atoms, a —CH$_2$CH$_2$N(R$^1$)SO$_2$— group (wherein R$^1$ is an alkyl group having 1 to 4 carbon atoms) or —CH$_2$CH(OY$^1$)CH$_2$— group (wherein Y$^1$ is a hydrogen atom or an acetyl group), Rf is a linear or branched fluoroalkyl group having 1 to 21 carbon atoms, wherein the fluorine-containing polymer comprises an organopolysiloxane moiety derived from (B) a mercapto group-containing organopolysiloxane, and also comprises repeating units derived from an olefinically unsaturated monomer (C') containing an acid phosphate ester, phosphonic acid or acid phosphonate ester group, are novel polymers and may have advantages in imparting oleophobicity and oil repellency to fabrics without imparting a harsh feel to the fabric surface in addition to being useful in rendering paper oleophobic.

Examples of monomers (C') containing an acid phosphate ester, phosphonic acid or acid phosphonate ester group include:
CH$_2$=C(CH$_3$)COOCH$_2$CH$_2$OP(O)(OH)$_2$
CH$_2$=C(CH$_3$)COOCH$_2$CH$_2$P(O)(OH)$_2$
CH$_2$=C(CH$_3$)COOCH$_2$CH$_2$OP(O)(OH)(OR*)
CH$_2$=C(CH$_3$)COOCH$_2$CH$_2$P(O)(OH)(OR*)
where R* is a alkyl group having 1 to 30, for example 1 to 4 carbon atoms such as methyl. The monomer (C') can be present in acid or salt form.

The fluorine-containing polymer may contain repeating units derived from a crosslinkable monomer. The crosslinkable monomer can be a fluorine-free vinyl monomer having at least two reactive groups and/or carbon-carbon atoms. Thus the crosslinkable monomer may be a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate group, an amino group and a carboxyl group.

Examples of the crosslinkable monomer include diacetoneacrylamide, (meth)acrylamide, N-methylolacrylamide, hydroxymethyl(meth)acrylate, hydroxyethyl(meth)acrylate, 3-chloro-2-hydroxypropyl(meth)acrylate, N,N-dimethylaminoethyl (meth)acrylate, N,N-diethylaminoethyl(meth)acrylate, butadiene, chloroprene and glycidyl(meth)acrylate The fluorine-containing polymer used in the invention can for example be prepared by reacting the fluorine-containing monomer (A) and the mercapto-functional organopolysiloxane (B) and optionally a fluorine-free monomer (C) in a free radical polymerisation reaction. The process may be conducted in the presence of a polar organic solvent. The polar organic solvent can be one or more alcohol, ketone or ester solvents selected from butanol, t-butanol, isopropanol, butoxyethanol, methyl isobutyl ketone, methyl ethyl ketone, butyl acetate or ethyl acetate and/or an aromatic hydrocarbon such as xylene, toluene or trimethylbenzene or a blend of one or more of these.

The initiator for the free radical polymerisation reaction can be any compound known in the art for initiating free radical reactions, such as organic peroxides or azo compounds. Representative, non-limiting examples are; azo compounds such as azobisisobutyronitrile or azoisovaleronitrile (AIVN), peroxides such as benzoyl peroxide. The polymerisation temperature typically ranges 50-120° C.

Alternatively the polymeric reaction product can be obtained using the technique of emulsion polymerisation, where all the components are polymerised in the presence of water, surfactants and polymerisation initiator.

The fluorine-containing polymer can contain various ratios of the fluorine-containing monomer (A), the mercapto organopolysiloxane (B) and the optional fluorine-free monomer (C), as controlled by the amount of each components (A), (B), and optional (C) are added to the reaction. The fluorine-containing polymer may for example contain 5 to 95% by weight of the fluorine-containing monomer (A), 0.1 to 95% by weight of the mercapto organopolysiloxane (B), and 0 to 70% by weight of olefinically unsaturated fluorine-free co-monomers (C). When the fluorine-containing polymer contains a monomer (C') containing an acid phosphate ester, phosphonic acid or acid phosphonate ester group, the fluorine-containing polymer may for example comprise 5 to 95 wt. % of fluorine-containing monomer (A),
0.1 to 95 wt % of the mercapto organopolysiloxane (B),
0.1 to 70 wt. % of the monomer (C') containing an acid phosphate ester, phosphonic acid or acid phosphonate ester group and
0 to 70 wt % of an olefinically unsaturated fluorine-free and phosphorus-free monomer (C").

A fluorosilicone product having a high proportion of mercapto organopolysiloxane may provide greater substantivity to fibrous substrates such as paper. A polymeric product having a high proportion of fluorine-containing monomer may provide maximum hydrophobicity and oleophobicity.

The fluorine-containing polymer reaction product is generally obtained as a solution. It can be isolated by evaporation of the solvent. For application as an oil repellent, the fluorosilicone reaction product is generally required in liquid form and the solution obtained by reaction can often be diluted to a solution suitable for application to paper. Alternatively the fluorine-containing polymer reaction product can be dissolved in a different solvent for application to paper, for example in a polar organic solvent of higher boiling point. The fluorine-containing polymer reaction product can alternatively be emulsified by mixing with water and an emulsifying agent, such as a cationic surfactant and/or a nonionic or anionic surfactant. The fluorine-containing polymer reaction product can be isolated before emulsification or the polymerisation product solution can be emulsified without isolation of the polymer, optionally with removal of solvent. If the polymeric product is obtained by emulsion polymerisation, the emulsion is generally used, diluted as required, without isolating the polymeric product.

The fluorine-containing polymer can be applied to paper according to the invention by coating it on pre-formed paper, or the fluorine-containing polymer can be applied as a size during the papermaking process. If it is applied as a size, it is applied at any stage after the papermaking fibres have been deposited on a wire and drained, and before the final drying step. The paper may for example be subjected to an initial drying and pressing step before the fluorine-containing polymer is applied as a size. When the fluorine-containing polymer is applied as a size, it is preferably applied from aqueous emulsion, although application from polar organic solvent solution is an alternative. When the fluorine-containing polymer is applied on pre-formed paper, it can be applied from aqueous emulsion or from polar organic solvent solution.

Paper rendered oleophobic according to the invention can be used in all the applications for which greaseproof paper is conventionally used, for example in food processing, including baking, and in packaging of foods, including oily or fatty foods.

EXAMPLES

Hereinafter, the present invention will be described in more detail by way of Examples which are illustrative only, and should not be construed as limiting the scope of the present invention in any way. Throughout Examples, "parts" and "%" are "parts by weight" and "% by weight", unless otherwise specified. The testing method used is as follows.

Greaseproofness

The greaseproofness of paper was measured according to the procedure of TAPPI UM-557. One drop of each of test oils indicated in Table I was placed on paper, and the penetration of the oil into the paper was observed 15 seconds later. The maximum of the greaseproofness degrees of a test oil which did not penetrate paper was taken as greaseproofness.

TABLE 1

| Grease proofness degree | Castor oil | Toluene | Heptane |
|---|---|---|---|
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |

Polymers were prepared as follows:

Preparative Example 1

Into a 300 cc flask, $CF_3CF_2-(CF_2CF_2)_n-CH_2CH_2OCOCCl=CH_2$ (n=1.0) (33 g), stearyl acrylate (18 g), N-methylol acrylamide (1.1 g), 3-chloro-2-hydroxypropyl methacrylate (0.53 g), 2.5 g of an aminomercapto siloxane of the general formula

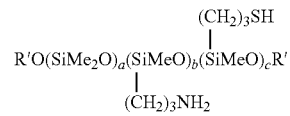

(prepared according to the procedures outlined in PCT Application No. US06/017703), pure water (66.1 g), tripropylene glycol (14.4 g), acetic acid (0.11 g), polyoxyalkyl ether (0.7 g), polyoxyethylene sorbitan monolaurate (2.8 g) and stearyl-trimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give a polymer dispersion. Pure water was added to the polymer dispersion to give an aqueous dispersion of polymer having a solid content of 30%.

Preparative Example 2

Into a 1 L autoclave, $CF_3CF_2-(CF_2CF_2)_n-CH_2CH_2OCOCCl=CH_2$ (n=1.0) (87.2 g), stearyl acrylate (11.3 g), N-methylol acrylamide (2.8 g), 3-chloro-2-hydroxypropyl methacrylate (0.67 g), the aminomercapto siloxane of Example 1 (30.4 g), pure water (236 g), tripropylene glycol (36.6 g), acetic acid (0.67 g), dialkyldimethyl ammonium chloride (3.0 g), sorbitan monopalmitate (2.1 g), polyoxyethylene oleyl ether (2.1 g) and polyoxyethylene polyoxypropylene cetyl ether (6.4 g) were charged and emulsified by ultrasonic wave at 60° C. for 15 minutes with stirring. The atmosphere of the flask was replaced with nitrogen, and then vinyl chloride (33 g) was injected. Further, 2,2'-azobis(2-amidinopropane) dihydrochloride (1.12 g) was added and the reaction was conducted at 60° C. for 5 hours to give a polymer dispersion. Pure water was added to the polymer dispersion to give an aqueous dispersion of polymer having a solid content of 30%.

Preparative Example 3

Into a 300 cc flask, $CF_3CF_2-(CF_2CF_2)_n-CH_2CH_2OCOCCl=CH_2$ (n=1.0) (33 g), stearyl acrylate (18 g), N-methylol acrylamide (1.1 g), 3-chloro-2-hydroxypropyl methacrylate (0.53 g), the aminomercapto siloxane of Example 1 (2.5 g), pure water (66.1 g), tripropylene glycol (14.4 g), acetic acid (0.11 g), polyoxyalkyl ether (0.7 g), polyoxyethylene sorbitan monolaurate (2.8 g) and stearyltrimethyl ammonium chloride (2.1 g) were charged. A mixture liquid prepared by previously mixing $CH_2=C(CH_3)COOCH_2CH_2OP(O)(OH)_2$ (2.6 g), diethanol amine (2.25 g) and pure water (25 g) was added to the flask and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give a polymer dispersion. Pure water was added to the polymer dispersion to give an aqueous dispersion of polymer having a solid content of 30%.

Preparative Example 4

Into a 300 cc flask, $CF_3CF_2-(CF_2CF_2)_n-CH_2CH_2OCOCCl=CH_2$ (n=1.0) (33 g), stearyl acrylate (18 g), N-methylol acrylamide (1.1 g), 3-chloro-2-hydroxypropyl methacrylate (0.53 g), $CH_2=C(CH_3)COOCH_2CH_2OP(O)(OH)_2$ (0.52 g), the aminomercapto siloxane of Example 1 (2.5 g), pure water (66.1 g), tripropylene glycol (14.4 g), acetic acid (0.11 g), polyoxyalkyl ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give a polymer dispersion. Pure water was added to the polymer dispersion to give an aqueous dispersion of polymer having a solid content of 30%.

Comparative Preparative Example 1

Into a 300 cc flask, $CF_3CF_2-(CF_2CF_2)_n-CH_2CH_2OCOCCl=CH_2$ (n=1.0) (33 g), stearyl acrylate (18 g), N-methylol acrylamide (1.1 g), 3-chloro-2-hydroxypropyl methacrylate (0.53 g), n-dodecyl mercaptan (0.04 g), pure water (66.1 g), tripropylene glycol (14.4 g), acetic acid (0.11 g), polyoxyalkyl ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give a polymer dispersion. Pure water was added to the polymer dispersion to give an aqueous dispersion of polymer having a solid content of 30%.

Comparative Preparative Example 2

Into a 1 L autoclave, $CF_3CF_2-(CF_2CF_2)_n-CH_2CH_2OCOCCl=CH_2$ (n=1.0) (87.2 g), stearyl acrylate (11.3 g), N-methylol acrylamide (2.8 g), 3-chloro-2-hydroxypropyl methacrylate (0.67 g), pure water (236 g), tripropylene glycol (36.6 g), acetic acid (0.67 g), dialkyldimethyl ammonium chloride (3.0 g), sorbitan monopalmitate (2.1 g), polyoxyethylene oleyl ether (2.1 g) and polyoxyethylene polyoxypropylene cetyl ether (6.4 g) were charged and emulsified by ultrasonic wave at 60° C. for 15 minutes with stirring. n-Dodecyl mercaptan (0.69 g) was added. The atmosphere of the flask was replaced with nitrogen, and then vinyl chloride (33 g) was injected. Further, 2,2'-azobis(2-amidinopropane) dihydrochloride (1.12 g) was added and the reaction was conducted at 60° C. for 5 hours to give a polymer dispersion. Pure water was added to the polymer dispersion to give an aqueous dispersion of polymer having a solid content of 30%.

Comparative Preparative Example 3

Into a 300 cc flask, $CF_3CF_2-(CF_2CF_2)_n-CH_2CH_2OCOCCl=CH_2$ (n=1.0) (33 g), stearyl acrylate (18 g), N-methylol acrylamide (1.1 g), 3-chloro-2-hydroxypropyl methacrylate (0.53 g), n-dodecyl mercaptan (0.04 g), pure water (66.1 g), tripropylene glycol (14.4 g), acetic acid (0.11 g), polyoxyalkyl ether (0.7 g), polyoxyethylene sorbitan monolaurate (2.8 g) and stearyltrimethyl ammonium chloride (2.1 g) were charged. A mixture liquid prepared by previously mixing $CH_2=C(CH_3)COOCH_2CH_2OP(O)(OH)_2$ (2.6 g), diethanol amine (2.25 g) and pure water (25 g) was added to the flask and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give a polymer dispersion. Pure water was added to the polymer dispersion to give an aqueous dispersion of polymer having a solid content of 30%.

Comparative Preparative Example 4

Into a 300 cc flask, $CF_3CF_2-(CF_2CF_2)_n-CH_2CH_2OCOCCl=CH_2$ (n=1.0) (33 g), stearyl acrylate (18 g), N-methylol acrylamide (1.1 g), 3-chloro-2-hydroxypropyl methacrylate (0.53 g), $CH_2=C(CH_3)COOCH_2CH_2OP(O)(OH)_2$ (0.52 g), n-dodecyl mercaptan (0.04 g), pure water (66.1 g), tripropylene glycol (14.4 g), acetic acid (0.11 g), polyoxyalkyl ether (0.7 g), polyoxyethylene sorbitan monolaurate (2.8 g) and stearyltrimethyl ammonium chloride (2.1 g) were charged and emulsified by ultrasonic wave at 60° C. for 15 minutes with stirring. The atmosphere of the flask was replaced with nitrogen, and then 2,2'-azobis(2-amidinopropane) dihydrochloride (0.3 g) was added and the reaction was conducted at 60° C. for 3 hours to give a polymer dispersion. Pure water was added to the polymer dispersion to give an aqueous dispersion of polymer having a solid content of 30%.

A base paper to be coated with a polymer liquid was prepared in the following manner.

An aqueous solution of a polyamide-polyamine-epichlorohydrin reaction product having a solid content of 1% (WS-570 manufactured by Nippon PMC) (0.88 g) was added to a 1.75% aqueous dispersion (250 g) of a mixture of 90 parts of bleached kraft pulp of broad-leaved trees and 10 parts of bleached kraft pulp of needle-leaved trees, which was beaten to have a freeness of 500 cc (Canadian Freeness), with stirring the aqueous dispersion, and then further stirred for 2 minutes.

The resultant pulp slurry was subjected to a paper manufacture using a hand-made paper machine described in JIS P8209. The hand-made paper machine had been modified to give a paper size of 25 cm×25 cm.

A wet paper was sandwiched between filter papers, pressed at a pressure of 3.5 kg/cm to sufficiently absorb off water, and dried in a drum dryer at 115° C. for 70 seconds to give a base paper. The basis weight of the base paper was 70 g/m².

An aqueous solution of starch was prepared by adding a starch (2-hydroxyethyl starch ether) (PENFORD R GUM 290 manufactured by Penford Corporation) (10 g) to water (90 g) to give a mixture. The mixture was heated to and maintained at about 80-90° C. for about 30 minutes and then cooled to give a 10% aqueous solution of starch.

Examples 1 to 4 and Comparative Examples 1 to 4

External Addition Without Auxiliary Substance (Starch)

Each of the waterproof and grease-proof emulsions prepared in Preparative Examples 1 to 4 and Comparative Preparative Examples 1 to 4 was diluted with water to give a desired solid concentration shown in Table 2.

The base paper was immersed in the diluted emulsion, squeezed with a squeezing machine at a squeeze pressure of 0.1 kg/cm, and dried in a drum dryer at 115° C. for 70 seconds. The grease proofness of this grease-proof paper was evaluated. The results are shown in Table 2.

TABLE 2

Without auxiliary substance (starch)

| | Waterproof and grease-proof agent (% solid in bath) | |
|---|---|---|
| | 0.45% | 1.0% |
| Example 1 | 5 | 8 |
| Example 2 | 6 | 7 |
| Example 3 | 0 | 0 |
| Example 4 | 2 | 4 |
| Comparative Example 1 | 4 | 7 |
| Comparative Example 2 | 5 | 6 |
| Comparative Example 3 | 0 | 0 |
| Comparative Example 4 | 0 | 0 |

Examples 5 to 8 and Comparative Example 5 to 8

External Addition with Auxiliary Substance (Starch)

Each of the waterproof and grease-proof emulsions prepared in Preparative Examples 1 to 4 and Comparative Preparative Examples 1 to 4 was diluted with water. The starch solution was diluted with water and mixed with the diluted emulsion so that the waterproof and grease-proof agent had a desired concentration shown in Table 3 and the starch had a solid content of 5%. Examples 5 to 8 and Comparative Examples 5 to 8 used the waterproof and grease-proof emulsions prepared in Preparative Examples 1 to 4 and Comparative Preparative Examples 1 to 4 respectively.

The base paper was immersed in the diluted liquid, squeezed with a squeezing machine at a squeeze pressure of 0.1 kg/cm, and dried in a drum dryer at 115° C. for 70 seconds. The grease proofness of this grease-proof paper was evaluated. The results are shown in Table 3.

TABLE 3

With auxiliary substance (starch 5%)

| | Waterproof and grease-proof agent (% solid in bath) | |
|---|---|---|
| | 0.45% | 1.0% |
| Example 5 | 4 | 6 |
| Example 6 | 8 | 8 |
| Example 7 | 6 | 8 |
| Example 8 | 5 | 6 |
| Comparative Example 5 | 3 | 5 |
| Comparative Example 6 | 6 | 7 |
| Comparative Example 7 | 1 | 6 |
| Comparative Example 8 | 3 | 5 |

The invention claimed is:

1. A fluorine-containing polymer comprising repeating units derived from:
    (A) a monomer which comprises a fluorine-containing monomer of the formula:

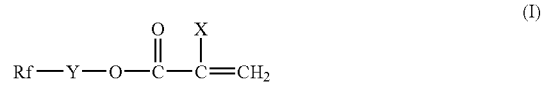

(I)

wherein X is a hydrogen atom, an linear or branched alkyl group having 1 to 21 carbon atoms, a fluorine atom, a chlorine atom, a bromine atom, a iodide atom, a $CFX^1X^2$ group (wherein $X^1$ and $X^2$ is a hydrogen atom, a fluorine atom, a chlorine atom, a bromine atom or a iodide atom.), a cyano group, a linear or branched fluoroalkyl group having 1 to 21 carbon atoms, a substituted or unsubstituted benzyl group, or a substituted or unsubstituted phenyl group,
    Y is an aliphatic group having 1 to 10 carbon atoms, an aromatic or cycloaliphatic group having 6 to 10 carbon atoms,
    a —$CH_2CH_2N(R^1)SO_2$— group (wherein $R^1$ is an alkyl group having 1 to 4 carbon atoms) or
    —$CH_2CH(OY^1)CH_2$— group (wherein $Y^1$ is a hydrogen atom or an acetyl group), and Rf is a linear or branched fluoroalkyl group having 1 to 21 carbon atoms,
    wherein the fluorine-containing polymer comprises an organopolysiloxane moiety derived from (B) a mercapto group-containing organopolysiloxane,
    and also comprises repeating units derived from an olefinically unsaturated monomer (C') containing an acid phosphate ester, phosphonic acid or acid phosphonate ester group.

2. A polymer according to claim 1, wherein the Rf group in the fluorine-containing monomer (A) has 1 to 4 carbon atoms.

3. A polymer according to claim 1, wherein the Rf group in the fluorine-containing monomer (A) is a perfluoroalkyl group.

4. A polymer according to claim 3, wherein the fluorine-containing polymer also comprises repeating units derived from an olefinically unsaturated fluorine-free and phosphorus-free monomer (C"), and optionally a crosslinkable monomer.

5. A polymer according to claim 1, wherein the monomer (C') comprises an acrylate of the general formula:

$$CH_2 = CA^1COOA^3$$

wherein $A^1$ is a hydrogen atom, a methyl group or a halogen atom other than a fluorine atom, and $A^3$ is a hydrocarbon group having 1 to 30 carbon atoms substituted by an acid phosphate ester, phosphonic acid or acid phosphonate ester group.

6. A polymer according to claim 1 wherein the mercapto functional organopolysiloxane comprises siloxane units having the average formula;

$$(R_2SiO)_a(RR^NSiO)_b(RR^SSiO)_c$$

where;
- a is 0-4000, b is 1-1000, c is 1-1000,
- R is independently a monovalent organic group,
- $R^N$ is a monovalent amino functional organic group, and
- $R^S$ is a monovalent mercapto functional organic group.

7. A polymer according to claim 1, wherein the fluorine-containing polymer comprises
- 5 to 95 wt. % of fluorine-containing monomer (A),
- 0.1 to 95 wt % of the mercapto organopolysiloxane (B),
- 0.1 to 70 wt. % of the monomer (C') containing an acid phosphate ester, phosphonic acid or acid phosphonate ester group and
- 0 to 70 wt % of an olefinically unsaturated fluorine-free and phosphorus-free monomer (C").

* * * * *